United States Patent [19]

Wieners et al.

[11] Patent Number: 5,129,031
[45] Date of Patent: Jul. 7, 1992

[54] CORE/SHELL OPTICAL WAVEGUIDES WITH CORES COMPRISING HALOGENATED PHENYL ACRYLATE OR METHACRYLATE

[75] Inventors: Gerhard Wieners, Frankfurt am Main; Rudolf Heumüller, Bad Soden am Taunus; Jochen Coutandin, Bretzenheim; Werner Groh, Frankfurt am Main; Peter Herbrechtsmeier, Königstein/Taunus, all of Fed. Rep. of Germany

[73] Assignee: Hoechst Aktiengesellschaft, Frankfurt am Main, Fed. Rep. of Germany

[21] Appl. No.: 587,960

[22] Filed: Sep. 25, 1990

Related U.S. Application Data

[63] Continuation of Ser. No. 112,823, Oct. 23, 1987, abandoned.

[30] Foreign Application Priority Data

Oct. 25, 1986 [DE] Fed. Rep. of Germany ....... 3636399

[51] Int. Cl.$^5$ .................. G02B 1/04; C08F 222/18
[52] U.S. Cl. .................... 385/143; 385/145; 526/245
[58] Field of Search ............... 350/96.29, 96.3, 96.34; 385/143, 145

[56] References Cited

U.S. PATENT DOCUMENTS

| | | | |
|---|---|---|---|
| 3,932,321 | 1/1976 | Maki | 525/146 |
| 4,110,296 | 8/1978 | Wang | 526/292.2 |
| 4,521,351 | 6/1985 | Ohtsuka | . |
| 4,615,584 | 10/1986 | Ohmori | 350/96.34 |

FOREIGN PATENT DOCUMENTS

| | | |
|---|---|---|
| 242404 | 12/1985 | Japan . |
| 91507 | 4/1987 | Japan . |
| 2089523 | 6/1982 | United Kingdom . |

*Primary Examiner*—Christopher Henderson

[57] ABSTRACT

Optical waveguides of very good heat resistance and good light conductivity are composed of polymers which are derived from halogenated phenyl acrylates or phenyl methacrylates.

6 Claims, No Drawings

CORE/SHELL OPTICAL WAVEGUIDES WITH CORES COMPRISING HALOGENATED PHENYL ACRYLATE OR METHACRYLATE

This is a continuation of our copending application Ser. No. 07/112,823, filed Oct. 23, 1987, now abandoned.

BACKGROUND OF THE INVENTION

1. Field of the Invention

The invention relates to optical waveguides which are suitable for the transmission of light signals. These optical waveguides have a high heat resistance.

2. Description of the Prior Art

Filamentous optical waveguides consist of a transparent material and are composed in most cases of a core and a shell, the core material always having a refractive index higher than that of the shell material. In addition, the core material and shell material should absorb as little light as possible.

The polymeric materials hitherto employed most frequently for optical waveguides are homopolymers and copolymers of methyl methacrylate. Whereas halogen-containing polymers have also been employed for the core, fluorine-containing polymers have hitherto been used for the shell, because they have a lower refractive index. To reduce the light absorption, it has also already been proposed to replace the hydrogen atoms in the monomers and polymers by deuterium.

Copolymers of trifluoromethacrylate and styrene or substituted styrene, for example halogen-containing styrene, are know (cf. German Offenlegungsschrift, 3,518,617). The copolymers are used, inter alia, as the shell material for optical fibers.

An optical waveguide has also been described, the core material of which is prepared by block polymerization of, inter alia, halogenated aryl methacrylate, for example pentafluorophenyl methacrylate (cf. Japanese Published application 60-242,404). Copolymers of vinylindene fluoride, tetralfuoroethylene and hexafluoropropylene are used as the shell material.

However, the abovementioned polymers do not give optical waveguides with a heat resistance adequate for certain fields of application.

SUMMARY OF THE INVENTION

It has now been found that optical waveguides with very good heat resistance and good light conductivity are obtained when the core and shell are composed of polymers derived from halogenate phenyl acrylates or phenyl methacrylates.

The invention thus relates to an optical waveguide, composed essentially of a fibrous transparent thermoplastic, wherein the plastic is a polymer which contains units derived from an ester of the formula (I)

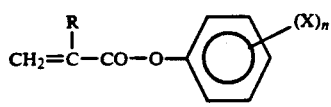

in which R is a hydrogen atom, a fluorine atom or a methyl group, X is a chlorine atom or a bromine atom and n is an integer from 1 to 5.

In the formula (I),

R is preferably a fluorine atom or a methyl group, especially a methyl group,
x is preferably bromine and
n is preferably 3, 4, or 5, especially 5.

DETAILED DESCRIPTION

Examples of compounds, to be employed according to the invention, of the formula (I) are:

Chlorophenyl acrylate, trichlorophenyl arcylate, tetrachlorophenyl acrylate, pentraclorophenyl acrylate, chlorophenyl fluoroacrylate, trichlorophenyl fluoroacrylate, tetrachlorphenyl fluoroacrylate, pentraclorophenyl fluoroacrylate, chlorophenyl methacrylate, trichlorophenyl methacrylate, tetrachlorophenyl methacrylate, pentraclorophenyl methacrylate, bromophenyl acrylate, dibromophenyl acrylate, tetrabromophenyl acrylate, pentraclorophenyl acrylate, bromophenyl fluoroacrylate, tribromophenyl fluoroacrylate, tetrabromophenyl fluoroacrylate, pentabromophenyl fluoroacrylate, bromophenyl methacrylate, tribromophenyl methacrylate, tetrabromophenyl methacrylate and pentabromophenyl methacrylate.

From amongst these monomers, pentraclorophenyl acrylate pentraclorophenyl fluoroacrylate, pentraclorophenyl methacrylate, pentabromophenyl acrylate, pentabromophenyl fluoroacrylate and pentabromophenyl methacrylate are preferably used, and with particular preference pentraclorophenyl methacrylate and pentabromophenyl methacrylate, especially pentabromophenyl methacrylate.

The monomers can be prepared in a known manner by reacting an arcyloyl halide, α-fluoroacryloyl halide or metharcyloyl halide with a (poly)halogenophenol.

In addition, the polymers contain units derived, for example, from the following monomers:

Alkyl acrylates, alkyl methacrylates, stryene, α-methylstryene, vinyl chloride and other halogen-containing monomers, maleic anhydride, acrylic acid and acrylonitrile.

Methyl methacrylate, stryene, hexafluoroisopropyl methacrylate, acrylonitrile and acrylic acid are preferred.

The polymers prepared from the said monomers by free-radical bulk polymerization are composed to the extent of 5 to 100% by weight, preferably 50 to 100% by weight, especially 55 to 95% by weight, of units derived from compounds of the formula (I). Up to 95% by weight, preferably up to 50% by weight, especially 5 to 45% by weight, of the units are derived from the monomers of the second group.

The polymers are transparent and form the material for the preparation of optical waveguides which can comprise a core and shell. The polymer for the shell of the optical waveguides can here be constituted by the same monomers as the polymer for the core. However, the halogen content in the shell polymer must be selectee such that the refractive index of the shell polymer is lower than that of the core polymer. The bromine-containing monomers are used here preferably.

| Core | Shell |
|---|---|
| Poly-(methyl methacrylate/ pentabromophenyl α-fluoroacrylate) | Polymethyl methacrylate |
| Poly-(methyl methacrylate/ pentachlorophenyl methacrylate) | Polymethyl methacrylate |
| Poly-(pentachlorophenyl | Poly-(tetrafluoro-n-propyl |

| Core | Shell |
|---|---|
| acrylate) | methacrylate/pentachlorophenyl acrylate) |
| Poly-(tetrafluoro-n-propyl methacrylate/pentachlorophenyl methacrylate) | Poly-(methyl methacrylate/tetrafluoro-n-propyl methacrylate) |
| Poly-(styrene/pentabromophenyl acrylate) | Polystyrene |
| Poly-(methyl methacrylate/pentabromophenyl methacrylate) | Poly-(methyl methacrylate/pentachlorophenyl methacrylate) |

The optical waveguide according to the invention is prepared by extrusion of one of the said polymers. In most cases, it is enveloped by a layer of a shell polymer. In a process for this purpose, the fibrous core polymer is drawn through a solution of the shell polymer in an anhydrous organic solvent, in which the core polymer is substantially insoluble, and the solvent is then removed,.

The solvent used, which essentially does not dissolve the core polymer, i.e. dissolves it only very sparingly or not at all, is especially a lower alkanol, preferably methanol, a lower ketone, preferably acetone, or an acetate of a lower alkanol, preferably ethyl acetate, or a chlorinated hydrocarbon, preferably chloroform. If appropriate, the solvent is used in the form of a mixture of several of the abovementioned individual solvent. The concentration of the shell polymer is the solution is 2 to 15 and preferably 6 to 10 percent by weight.

the core polymer fiber has a diameter of 0.1 to 2 mm, preferably 0.5 to 1 mm. For coating with the shell polymer, it is passed through the solution of the shell polymer which is in a container having a capillary orifice of circular cross-section at the bottom; its diameter is 10 to 40 per cent greater than the particular fiber diameter. Immediately after the emergence from the capillary orifice, the coated fiber is freed of adhering solvent. This is effected especially by evaporation at a temperature from 30° to 120° C., preferably 50° to 100° C., and under a pressure of 200 to 1000 mbar, preferably 800 to 1000 mbar. The thickness of the shell thus obtained is 0.003 to 0.05 mm, preferably 0.005 to 0.02 mm.

Further possibilities for the preparation of the optical waveguide according to the invention with a core/shell structure are:

1. Extrusion of the core and subsequent extrusion coating with the shell polymer.
2. Coextrustion of the core and shell components by means of an extruder and a bi-component spinneret.
3. Extrusion of the core and subsequent application of the shell polymer in the form of a dispersion, drying and sintering of the dispersion or the dispersion film.

The optical waveguide according to the invention is suitable for transmitting lightwaves of a wavelength from 500 to 750 nm, preferably 630 to 670 nm. It shows an attenuation of at most 1500, preferably at most 1000 dB/km. It is distinguished by very good heat resistance and, therefore, can be used in locations with high heat stress, for example in automobiles.

EXAMPLE 1

A copolymer of 40 parts of methyl metharcylate (MMA) and 60 parts of pentabromophenyl fluoroacrylate (PBP/FA) was extruded by means of an extruder to give an optical waveguide. Of the light intensity radiated into one end face of the optical waveguide, 51% was still detectable after 3 m and 73% after 1 m. After storage for four days at 120° C. and 100 mbar atmospheric humidity, the light transmission fell to 50% at 3 m fiber lengths.

EXAMPLE 2

A copolymer of 50 parts of MMA and 50 parts of pentabromophenyl methacrylate was extruded to give a wire of 0.9 mm diameter and was drawn through a solution of 10 parts by weight of poly-(methacrylate/pentachlorophenyl methacrylate) in 90 parts by weight of a mixture of ethyl acetate and chloroform. The diameter of the bottom orifice, drawn out to form a capillary, of the container with the polymer solution was 1.1 mm. The coated wire was passed through a tube heated to 50° C. in countercurrent to a 0.4 m/second stream of dry filtered nitrogen, and was dried. Of the light intensity radiated into this optical waveguide, 71% was still detectable after 1 m and 47% after 3 m. After storage for four days at 120° C. and 100 mbar atmospheric humidity, the light transmission through a 3 meter long optical waveguide remained unchanged.

EXAMPLE 3

A wire of poly-(pentachlorophenyl acrylate) was coated by the procedure of Example 2 with a solution of a copolymer of 2,2,3,3,-tetrafluoro-n-propyl methacrylate and pentachlorophenyl acrylate in acetone/trichlorotrifluoroethane. The light transmission of this optical waveguide was 70% after 1 meter and 45% after 3 meters length. After storage for four days at 120° C. and 100 mbar atmospheric humidity, the light transmission fell to 42% after 3 meters length.

EXAMPLE 4

A copolymer of 31 parts by weight of methyl metharcylate and 69 parts by weight of pentachlorophenyl methacrylate as the core material was extruded, together with polymethyl methacrylate as the shell, by means of a two-component extrusion unit and a bi-component spinneret to give an optical waveguide of core/shell structure. The light transmission of this optical waveguide was 74% after 1 meter and 52% after 3 meters. After storage for four days at 120° C. and 100 mbar atmospheric humidity, the transmission was still 50% after 3 meters.

COMPARISON EXAMPLE

A three meter long piece of an optical waveguide of polymethyl methacrylate showed a light transmission of 70% as the start of the experiment. Even after storage for three hours at 120° C., the length of the fiber had shrunk by 20% and the light transmission had fallen to 10% of the light intensity radiated in.

We claim:

1. An optical waveguide consisting essentially of an elongated transparent thermoplastic polymeric fiber core surrounded by a transparent thermoplastic polymeric shell, the refractive index of the core polymer being greater than that of the shell polymer, the core polymer being a copolymer derived from monomers consisting essentially of methyl methacrylate and pentabromophenyl fluoroacrylate, at least 50% by weight of the units of the copolymer being derived from pentabromophenyl fluoroacrylate.

2. An optical waveguide consisting essentially of an elongated transparent thermoplastic polymeric fiber core surrounded by a transparent polymeric shell, the refractive index of the core polymer being greater than that of the shell polymer, said optical waveguide having one of the following core/shell combination:
(a) core: poly-(methyl methacrylate/pentabromophenyl α-fluoroacrylate)
  shell: polymethyl methacrylate or
(b) core: poly-(methyl methacrylate/pentachlorophenyl methacrylate)
  shell: polymethyl methacrylate or
(c) core: poly-(pentachlorophenyl acrylate)
  shell: poly-(tetrafluoro-n-propyl methacrylate/pentachlorophenyl acrylate) or
(d) core: poly-(tetrafluoro-n-propyl methacrylate/pentachlorophenyl methacrylate)
  shell: poly-(methyl methacrylate/tetrafluoro-n-propyl methacrylate) or
(e) core: poly-(stryene/pentabromophenyl acrylate)
  shell: polystyrene or
(f) core: poly-(methyl methacrylate/pentabromophenyl methacrylate)
  shell: poly-(methyl methacrylate/pentachlorophenyl emthacrylate).

3. An optical waveguide as claimed in claim 2, wherein said core polymer comprises at least 50 per cent by weight of units derived from at least one of the following esters: pentabromophenyl α-fluoroacrylate, pentachlorophenyl methacrylate, pentachlorophenyl acrylate, pentabromophenyl acrylate, or pentabromophenyl methacrylate.

4. An optical waveguide as claimed in claim 2, wherein the core polymer is a copolymer derived from ethyl methacrylate and pentabromophenyl fluoroacrylate.

5. An optical waveguide as claimed in claim 4, wherein the core polymer is a copolymer derived from methyl methacrylate and pentabromophenyl fluoroacrylate.

6. An optical waveguide consisting essentially of an elongated transparent thermoplastic polymeric fiber core surrounded by a transparent thermoplastic polymeric shell, the refractive index of the core polymer being greater than that of the shell polymer, the core polymer containing 5 to 100% by weight of units derived from pentabromophenyl fluoroacrylate and 5 to 95% by weight of an alkyl acrylate or alkyl methacrylate.

* * * * *